(12) United States Patent
Lizotte et al.

(10) Patent No.: US 7,927,525 B2
(45) Date of Patent: Apr. 19, 2011

(54) VACUUM ISOSTATIC MICRO MOLDING OF MICRO/NANO STRUCTURES AND MICRO TRANSFER METAL FILMS INTO PTFE AND PTFE COMPOUNDS

(76) Inventors: Todd E. Lizotte, Hooksett, NH (US); Orest Ohar, Auburn, NH (US)

( * ) Notice: Subject to any disclaimer, the term of this patent is extended or adjusted under 35 U.S.C. 154(b) by 0 days.

(21) Appl. No.: 12/196,896

(22) Filed: Aug. 22, 2008

(65) Prior Publication Data

US 2009/0072428 A1    Mar. 19, 2009

Related U.S. Application Data

(60) Provisional application No. 60/957,733, filed on Aug. 24, 2007.

(51) Int. Cl.
*B29D 7/01* (2006.01)
(52) U.S. Cl. ........ 264/127; 264/101; 264/102; 264/345; 264/348; 264/1.34
(58) Field of Classification Search .......... 264/101–102, 264/127, 345, 348; 977/900, 902, 904, 949
See application file for complete search history.

(56) References Cited

U.S. PATENT DOCUMENTS

| | | | | |
|---|---|---|---|---|
| 4,470,953 A * | 9/1984 | Bruce | ................ | 419/6 |
| 4,701,291 A * | 10/1987 | Wissman | ................ | 264/248 |
| 4,749,752 A * | 6/1988 | Youlu et al. | ................ | 525/199 |
| 4,761,264 A * | 8/1988 | Nishio et al. | ................ | 419/68 |
| 5,107,437 A | 4/1992 | Miller | | |
| 5,712,315 A * | 1/1998 | Dolan | ................ | 521/57 |
| 6,621,840 B2 * | 9/2003 | Araki | ................ | 372/39 |
| 2002/0187065 A1 * | 12/2002 | Amaya et al. | ................ | 419/8 |
| 2003/0106596 A1 * | 6/2003 | Yang et al. | ................ | 137/828 |
| 2004/0208774 A1 * | 10/2004 | Zhang | ................ | 419/48 |

* cited by examiner

*Primary Examiner* — Christina Johnson
*Assistant Examiner* — Xue Liu
(74) *Attorney, Agent, or Firm* — Davis & Bujold, P.L.L.C.

(57) ABSTRACT

A process of manufacturing micro or nanostructure surfaces or parts formed of PTFE by applying a vacuum to powered or granulated PTFE in a heated compression mold. The process further includes applying a compression anvil within the metallic mold, removing the mold from a heat source and quenching the mold while maintaining the pressure in the mold during quenching. A mold or mold insert may be manufactured from sintered metal, sintered ceramic or sintered stainless steel to allow the vacuum to be applied across a surface holding the micro or nanostructures.

11 Claims, 11 Drawing Sheets

NO VACUUM

VACUUM (@10 TORR)

NO VACUUM

VACUUM

VACUUM (@10 TORR)

VACUUM (@10 TORR)

NO VACUUM

VACUUM (210 TORR)

VACUUM (@10 TORR)

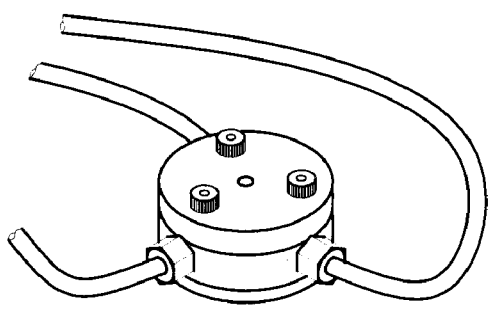
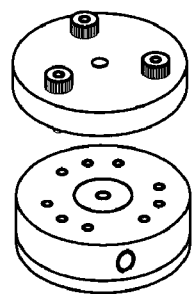
FIG. 12A  FIG. 12B
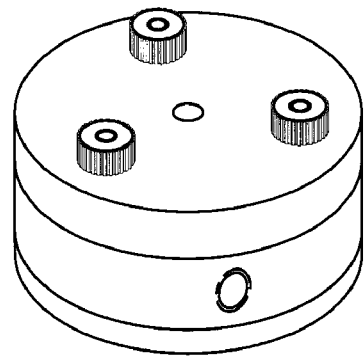
SMALL VACUUM ISOSTATIC MOLD (BOLTED COMPRESSION
FIG. 12C

VACUUM ISOSTATIC MICRO MOLDING OF MICRO/NANO STRUCTURES AND MICRO TRANSFER METAL FILMS INTO PTFE AND PTFE COMPOUNDS

FIELD OF THE INVENTION

The present invention relates to vacuum assisted isostatic and standard isostatic pressure micro-molding of PTFE, FEP and other PTFE compounds and, more particularly, the formation of micro-structures and nano-structures for use in micro fluidic systems such as inkjet, biomedical diagnostic devices and diffractive micro optical devices.

BACKGROUND

Polytetrafluoroethylene (PTFE) is an ideal material for use in industrial, medical, automotive and consumer electronics. Specifically, PTFE, fluorinated ethylene propylene (FEP) and other PTFE compounds have outstanding physical properties; such as chemical inertness and resistance to chemical corrosion, even when exposed to a variety of chemicals, such as a strong acid, an alkali and oxidants. Their physical properties provide superior electrical insulation and thermal stability, which is not affected by wide ranges in temperature and frequency. Their resistance to absorption of moisture makes them a perfect material for consideration in micro optical, retro-reflector or diffuser type devices used in handheld displays, flat panel displays as well as a variety of automotive, industrial, home lighting, and other applications where their properties are well suited are medical diagnostic devices, biochip, fluidic channels and micro-channel plates for electrophoresis.

Isostatic molding is the only process which is used for standard forming of PTFE and PTFE compound materials for macro-structures or to form large blocks which are subsequently machined, using traditional machine tools, into other macro products such as bearings, housings, etc. Isostatic molding of PTFE, FEP and PTFE compounds is typically achieved by placing a powdered compound into a mold form with one side of the mold applying a compression force which compresses the powder to closely conform to the shape and profile of the mold.

Standard isostatic or compression molding, bonding or forming processes rely on the assembly of parts or joints which are then subjected to isostatic or directional pressure, while simultaneously elevating the parts to its fusion temperature and maintaining this pressure through to the solidification phase forming an integral monolithic structure of pure PTFE, FEP or compounds of PTFE.

There are several methods that are used to create an isostatic or compression mold which can achieve the pressure required to form a desired component. Certain techniques utilize the differential thermal expansion between the PTFE and the material forming the mold, such as aluminum.

This allows the pressure to be achieved without having to use active pressure via a hydraulic press. However, this type of technique has limitations when the features or details being molded fall below standard surfaces finishes and where the aspect ratio of the micro or nano structures extends above the 1:1 aspect ratio. This type of mold is then either placed into a furnace or dunked into a molten bath of salt to raise the temperature quickly. Once a sufficient pressure and temperature for fusion is achieved, the mold is then quenched into water and allowed to cool. This quenching allows the mold to be cooled quickly and also sufficiently shocks the part being molded and this allows the part to be easily released from the mold.

The drawback of standard isostatic or compression molding, other than the limitations due to aspect ratio, is that the material density, any trapped air or other contaminant does not allow this standard isostatic molding to form sufficiently uniform features below two hundred (200 μm) microns. One primary reason is trapped air and other contaminants, such as trapped moisture, have a tendency to create voids, inclusions and/or change the density of the material. The inventors have discovered that by applying a vacuum to the mold during the molding process, any trapped air and/or moisture can be removed and this, in turn, also assists with self compression of the powder or palletized PTFE or PTFE compound self compresses, and eliminates potential voids and thereby allowing the mold anvil to compress the material to even higher densities than previously possible. This also allows tighter control of surface finish and dimensional control of the features being produced.

SUMMARY OF THE INVENTION

The present invention is directed to a process for the manufacture of micro or nanostructure surfaces or parts formed of PTFE.

According to the present invention, the process includes applying a vacuum to the powder or granulated PTFE located in the compression isostatic mold having an optimized vacuum of between 75 Torr and 1 Torr and applying a compression anvil within the metallic mold wherein the mold has an inside surface which conforms closely to the adjacent outer surface of the anvil. The mold is heated in a bath or by other heating means to achieve fusion of the PTFE placed under vacuum to said micro/nanostructured mold by reason of the differential cubic expansion of PTFE to said mold resulting in the formation of pressure on said PTFE material and micro/nanostructured mold insert or micro/nanostructured surface within said mold. The mold is then removed from the both, or the heating of the bath is otherwise terminated, and the mold is quenched with water to cause more rapid cooling of said mold than the micro structured mold or mold insert (nickel electroformed or silicon) therein, thereby maintaining said pressure thereon during at least a portion of the quench.

In presently preferred embodiment of the present process the mold or mold insert may be manufactured from sintered metal to allow the vacuum to be applied across a surface holding the micro or nanostructures or in close proximity, or from sintered ceramic to likewise allow the vacuum to be applied across the surface holding the micro or nanostructures or in close proximity, or from sintered stainless steel.

BRIEF DESCRIPTION OF THE DRAWINGS

The invention will now be described, by way of example, with reference to the accompanying drawings in which:

FIG. 12A illustrates a vacuum isostatic mold, bolted compression design, with 3 vacuum ports;

FIG. 12B shows a compressed and fused PTFE test slug in its final state, post vacuum isostatic molding with the anvil/mandrel removed; and, FIG. 12C shows the compressed and fused PTFE test slug in its final state, post vacuum isostatic molding with the anvil/mandrel removed (unbolted), showing the electroformed shim.

DETAILED DESCRIPTION OF THE INVENTION

Figure 1:
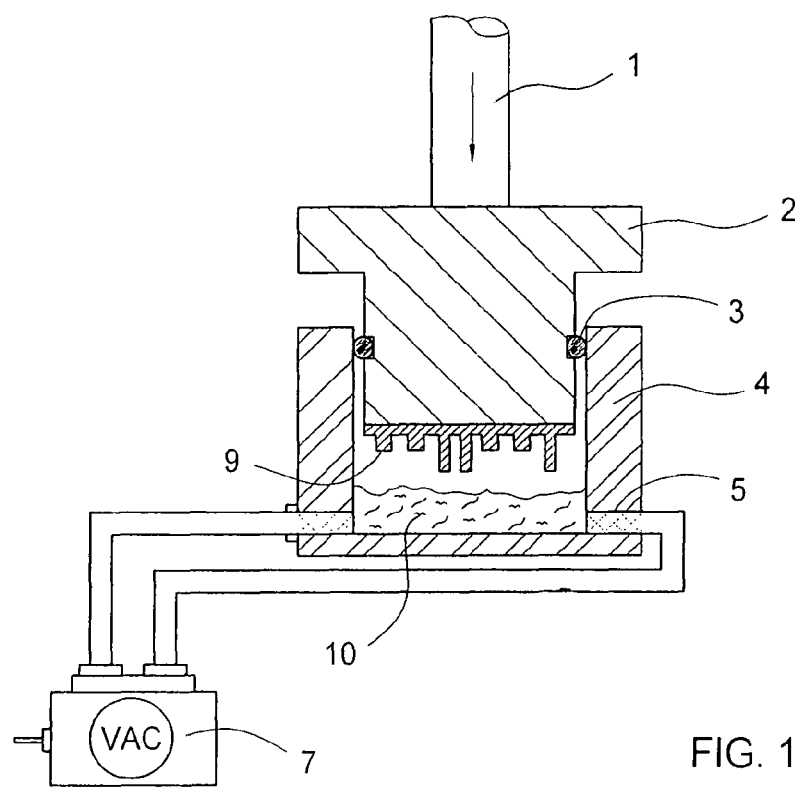
FIG. 1 is a hydraulic or pneumatic or manual mold allowing for a continuous vacuum.

As described herein above, PTFE is one of the most versatile engineering materials known and can readily be turned, milled, drilled, pierced, broached, ground and polished. By special processes, PTFE can also be isostatic and compression molded. In general, parts can be designed in the same manner as parts made of other materials. Even the same formula may be applied if careful attention is paid to the special characteristics of the resin. PTFE, due to its unique properties, is one of few materials that can boast of being almost completely chemically inert. At elevated temperatures and pressures, for example, PTFE remains substantially chemical inert even when subjected to a wide variety of industrial chemicals. This compatibility is the result of the strong inter-atomic bonds between the carbon-carbon and carbon-fluorine atoms, the almost perfect shielding of the carbon backbone by the fluorine atoms, and the high molecular weight. While nearly all plastics absorb small quantities of certain materials in which they come in contact, there is essentially no chemical reaction between PTFE and virtually any other substance.

As noted above, polytetrafluoroethylene (PTFE, FEP and PTFE compounds) are ideal materials for many applications. PTFE is particularly useful in environments where it is extremely important that the material itself is immune to contamination, e.g., by absorption and permeation, and where the product will not react with other products, such as samples which are to be measured. This is especially true for products used in biomedical diagnostics, analysis and bio reactors, which could benefit from micro-structured PTFE, FEP and PTFE compound substrates. As it applies to micro optics it is not currently considered an appropriate or very accessible material for use in forming micro optical or diffractive optical elements. The present invention makes it possible to realize structures well below one (1) micron in these PTFE, FEP and PTFE compounds.

In addition, the high molecular weight of PTFE and PTFE compounds reduces the number of microscopic voids between the molecules which provide for space for foreign substance to be lodged. At temperatures as high as 200° C., PTFE resins generally do not absorb any common acids or bases, even over extended exposures. In certain circumstances, because of the PTFE properties, additives can be combined with the PTFE to provide further fabrication options, such as bonding, but ultimately these compounds, such as FEP, have a tendency to reduce the effectiveness of the PTFE product once assembled. The use of traditional isostatic or compression molding techniques generally offer the benefit of a molding technique which can fabricate large more complex assemblies on a macro level, however, such techniques are typically unable to manufacture acceptable small micro or even nano size structures. The advantages of using PTFE for larger complex features begins to create a self limiting factor when features being molding begin to approach the scale of the granules or powder particle sizes of the PTFE.

As will be described in detail below, the molding process of the present invention utilizes the unique mechanical properties of PTFE enable the material to be specified for an extremely wide diversity of applications. In almost all categories of material specifications PTFE exceeds the limits of properties defined: chemical resistance, electrical stress, mechanical strength, service life, friction and wear, aging, bio-degradation, corrosion, contamination, light, humidity, adhesion, fire, vibration, etc. PTFE's intrinsic properties and qualities also enable reproduction of fine detail and features, on a macro scale, using convention processing methods. PTFE components begin life as compounds of premium grace granular resin. In this way the quality of the finished component can be determined at a very early stage by controlling the processes involved in converting the resin to a finished component. The pure material produced can be made into complex shapes without concern regarding grain structures, stresses, density, or other manufacturing considerations. PTFE has some outstanding properties since it belongs to a group of materials consisting almost entirely of Carbon and Fluorine. The structure is essentially a Carbon core shielded by a layer of Fluorine atoms held together by super-strong Carbon-Fluorine inter-atomic bonds. The effect makes the material almost totally chemically inert. The same molecular structure also renders the material almost totally insoluble and the extreme rigidity of the Fluorocarbon chain yields a high melting point.

The present invention uses a unique fabrication method that incorporates a variety of elements, such as vacuum, micro-machined and electro formed mold and/or embossing shims, coupled into a unique molding rig that allows the precise formation of micro diffractive, holographic and reflective structures into PTFE and PTFE compound or materials as well as form microstructures that create microfluidic structures or blind depth channels or other types of microstructures that can be used for a variety of micro devices or micro optical systems. The ability to form PTFE compounds into micro (>1 micron) and nano (<1 micron) structures is beneficial for a host of industries, including biomedical diagnostic devices, commercial and industrial inkjet printing and the field of diffractive optics. The use of PTFE, FEP and other PTFE compounds, offer a wide variety of opportunities for applications in harsh or demanding environments, especially industries and applications where acidic chemistry, excessive heat such as in jetted solder or hot wax inkjet printing, harsh chemistry for biomedical devices or for devices where sterilization at extreme temperatures is required. PTFE, FEP and PTFE compounds, such as ceramic filled PTFE, offer significant advantages as compared to traditional injection molded plastics.

First considering the process of the present invention as illustrated generally in the figures, FIG. 1 is a hydraulic or pneumatic or manual force 1 pressing down onto an anvil or mold mandrel or insert 2 with an integral seal 3 within the mold body or mold container 4 with a mold insert or shim or micro/nano structure 9 formed onto the surface or machined into the anvil which is driven, under load 1), into PTFE or high molecular weight polymers or compounds 10 while under vacuum 8), using a vacuum pump 7), which pulls a vacuum through ports 5 formed into the mold body 4 by means of vacuum lines that connect the mold body 4 to the vacuum pump 7), sintered stainless steel can be used at the ports 5 to allow for continuous vacuum.

Figure 2:
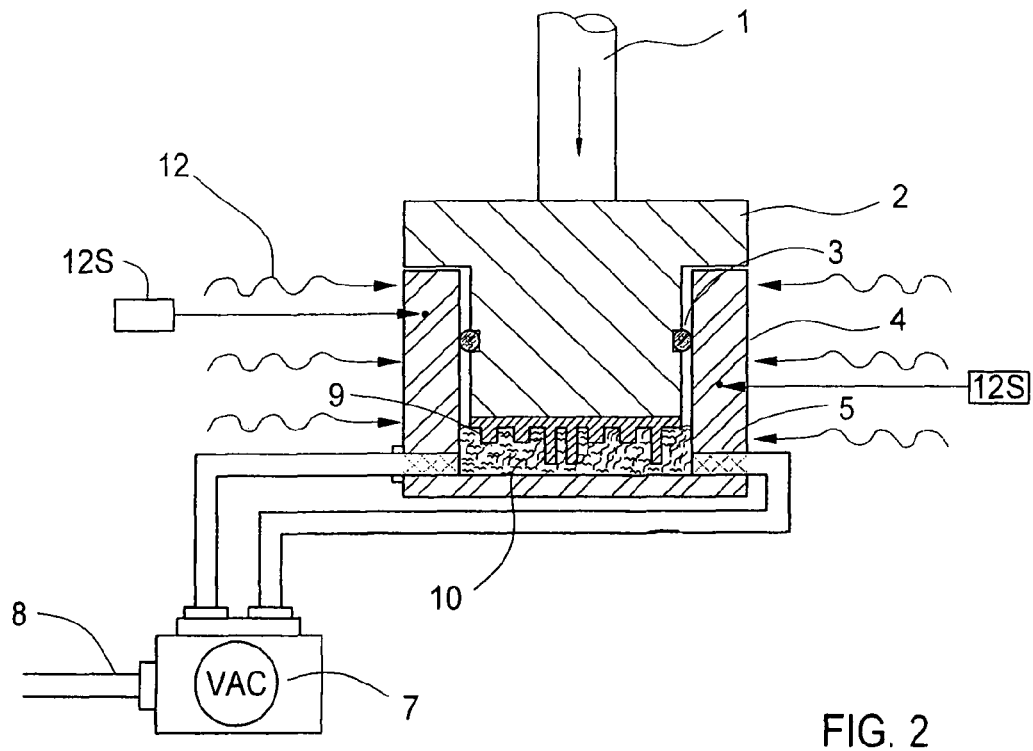
FIG. 2 illustrates the mold under vacuum with full compression and heat being applied externally.

As illustrated in FIG. 2, the mold is placed under vacuum with full compression and with heat being applied externally 12 by means of an a heat source 12S, such as an oven or by immersion into a hot liquid bath or through heating with an IR source such as diode laser bars.

Figure 3A:
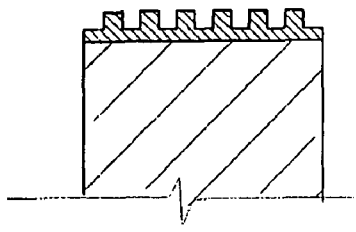
FIG. 3A—illustrates an anvil or mandrel with a microstructure or nano-structure formed directly to the surface of the anvil or mandrel.

FIG. 3A illustrates an anvil or mandrel having a microstructure or nano-structure and formed directly to the surface of the anvil or mandrel, by means of electro-forming of a metal, copper, nickel alloys or gold other materials that can be deposited by electro forming methods.

Figure 3B:
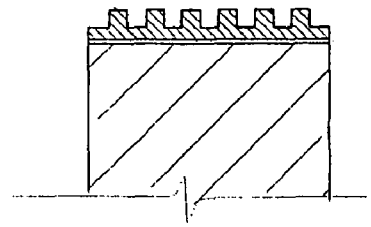
FIG. 3B illustrates an anvil or mandrel with a microstructure or nano-structure formed on top of a release layer or seed layer to attach a microstructured shim or electroformed micro/nano structure onto the anvil or mandrel.

FIG. 3B illustrated an anvil or mandrel having a microstructure or nano-structure and formed on top of a release layer or seed layer to attach the microstructured shim or electroformed micro/nano structure onto the anvil or mandrel. The release layer would be used to allow an electroformed structure to be transferred into the material being molded, such as an insert molded electrode array.

Figure 3C:
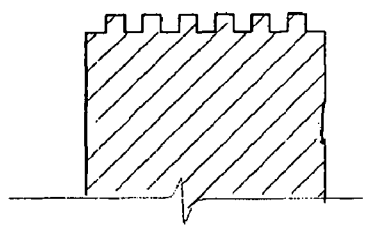
FIG. 3C illustrates an anvil or mandrel with a microstructure or nano-structure formed directly into the surface of the anvil or mandrel by means of a photo resist coating.

FIG. 3C illustrates an anvil or mandrel having a microstructure or nano-structure and formed directly into the surface of the anvil or mandrel, by means of a photo resist coating, exposure and development process with a final ion beam milling, chemical metal etching, or electrochemical metal etching of the exposed metal of the anvil or mandrel.

Figure 3D:
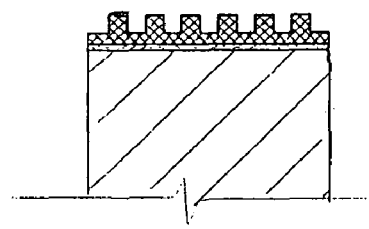
FIG. 3D illustrates an anvil or mandrel with a microstructure or nano-structured shim made from electroformed metal or a micro or nano-structured silicon wafer bonded to the anvil or mandrel surface by means of an adhesive or other bonding agent or contact adhesive.

FIG. 3D illustrates an anvil or mandrel having a microstructure or nano-structured shim made from electroformed metal or a micro or nano-structured silicon wafer which is bonded to the anvil or mandrel surface by means of an adhesive or other bonding agent or contact adhesive.

Figure 3E:
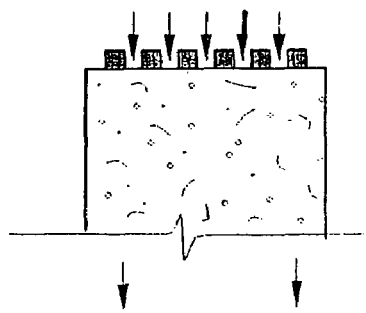
FIG. 3E illustrates an anvil or mandrel made from sinter metal allowing a vacuum to be drawn through the bulk anvil or mandrel material.

FIG. 3E illustrates an anvil or mandrel made from sinter metal such as sintered stainless steel or a sintered ceramic that is microscopically porous allowing a vacuum to be drawn through the bulk anvil or mandrel material, with a micro or nano-structure formed onto the surface of the sintered anvil or mandrel surface allowing the vacuum to be pulled between the features of the micro or nano-structure.

Figure 3F:
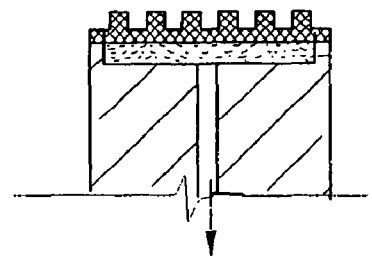
FIG. 3F illustrates an anvil or mandrel with a sintered material insert that allows a shim to be held onto the surface of the anvil or mandrel by means of a vacuum holding force.

FIG. 3F illustrates an anvil or mandrel with a sintered material insert that allows a micro or nano-structured shim or silicon wafer or other polymer micro or nano-structured shim to be held onto the surface of the anvil or mandrel by means of a vacuum holding force.

Figure 3G:
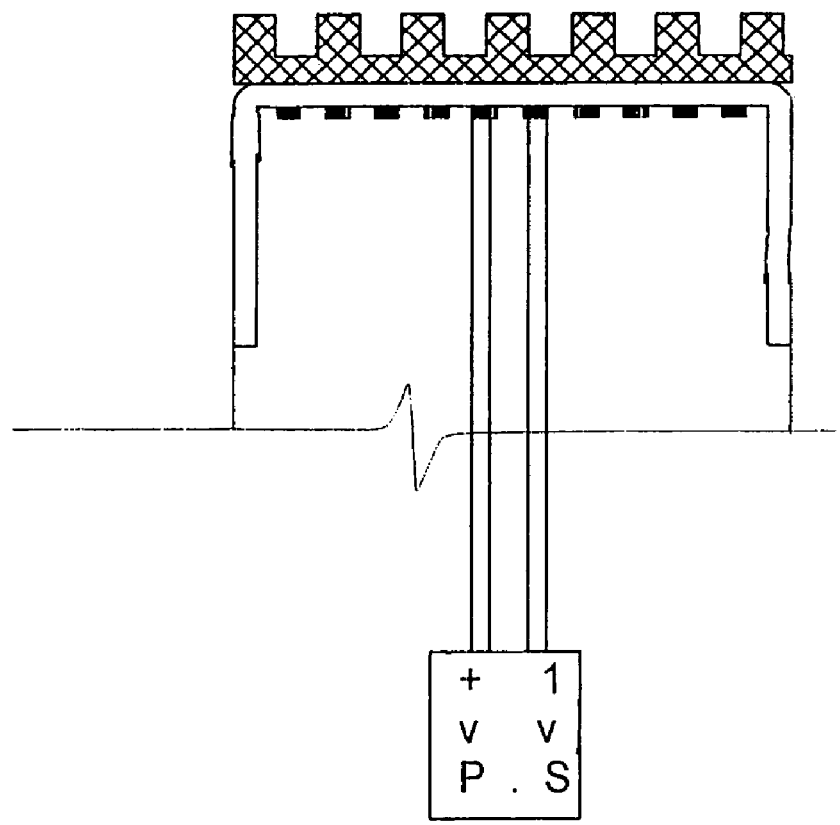
FIG. 3G illustrates an anvil or mandrel with an embedded capacitive array that imparts a electrostatic holding force.

FIG. 3G illustrates an anvil or mandrel with an embedded capacitive array that imparts a electrostatic holding force onto a micro or nano-structured shim or polymer film to hold the shim onto the surface of the anvil or mandrel surface.

Figure 4:
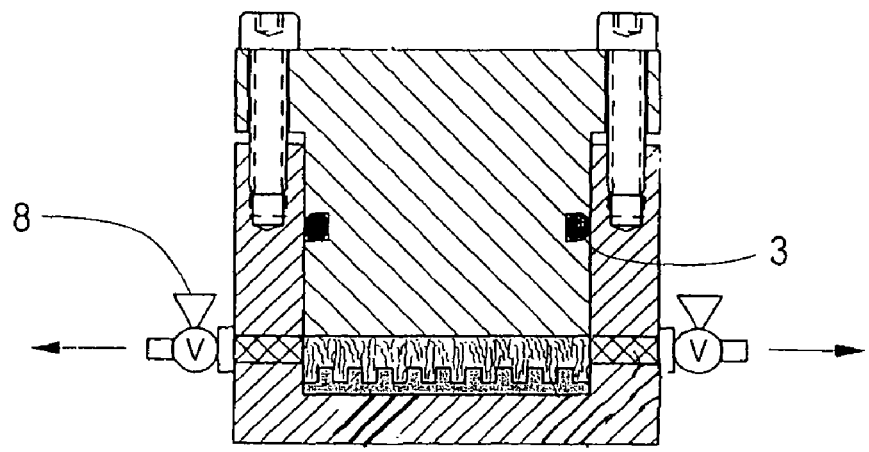
FIG. 4 illustrates a designed gap, bolted mold design with a shim or mold insert at the bottom of the mold.

FIG. 4 illustrates a bolted mold design having a designed gap with a micro or nano-structured shim or mold insert placed at the bottom of the mold as an alternative to being placed onto the mandrel or anvil surface, with closing valves on the mold to hold the vacuum once the material has been compressed to the designed compression and so that the final mold can be transferred to a oven or immersed into a heated fluid to fuse or cure the material into its final state.

Figure 5:
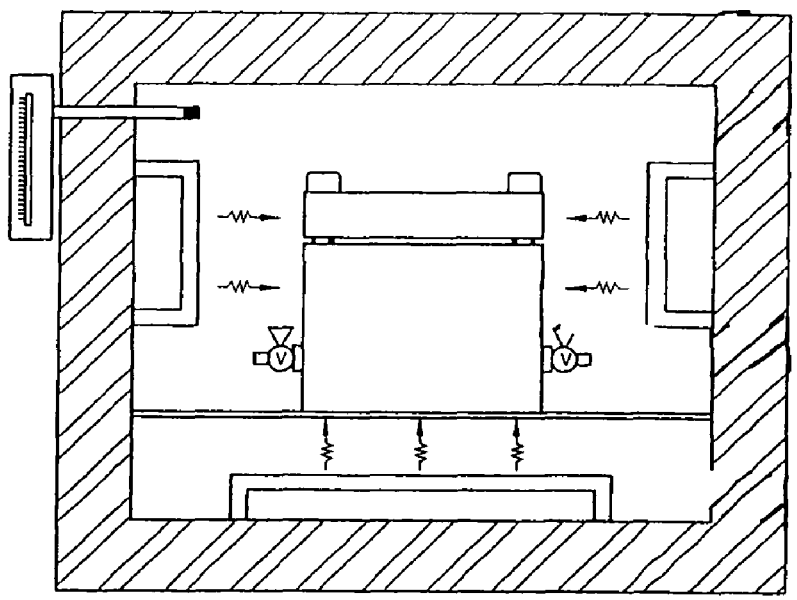
FIG. 5 illustrates the designed gap, bolted mold design placed into an oven for fusing or curing the PTFE material.

FIG. 5 illustrates the designed gap, bolted mold design as placed into an oven for fusing or curing the PTFE material.

Figure 6A:
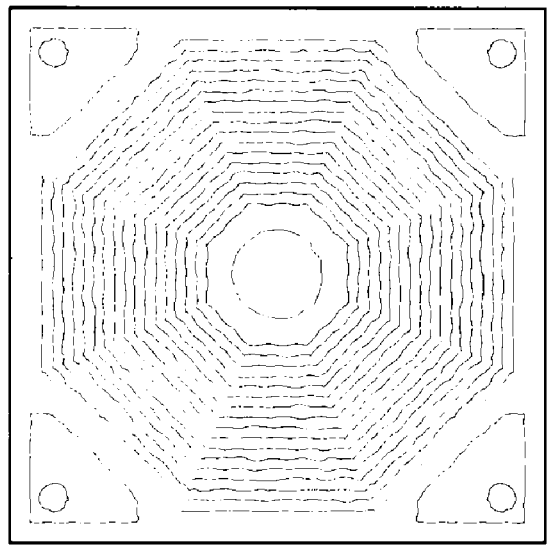
FIG. 6A illustrates an example of an electroformed coil structured shim used to isostatically mold a PTFE compound, without the use of vacuum.

FIG. 6A illustrates an example of an electroformed coil structured shim used to isostatically mold a PTFE compound, without the use of vacuum. Image shows reduced quality and inconsistent quality and problems resolving the 100 micron features.

Figure 6B:
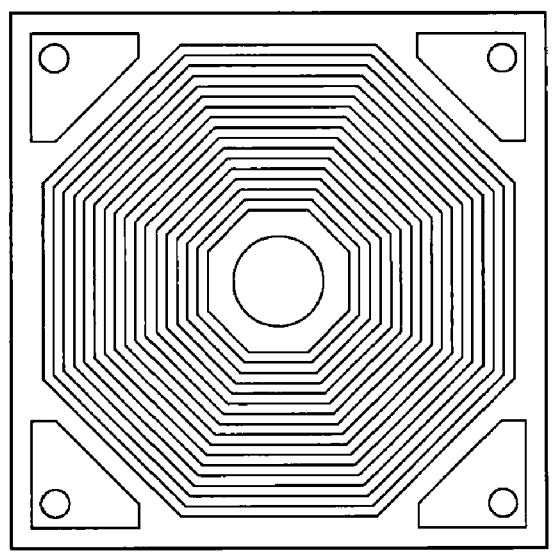
FIG. 6B illustrates an example of the same electroformed coil structured shim shown in 6A with the inside of the mold placed under vacuum and then heated to fuse the material.

FIG. 6B illustrates an example of the same electroformed coil structured shim shown in 6A, except that the inside of the mold is placed under vacuum to a vacuum pressure of 10 Torr and then heated to fuse the material. As can be seen the features are much clearer and well resolved.

Figure 7:
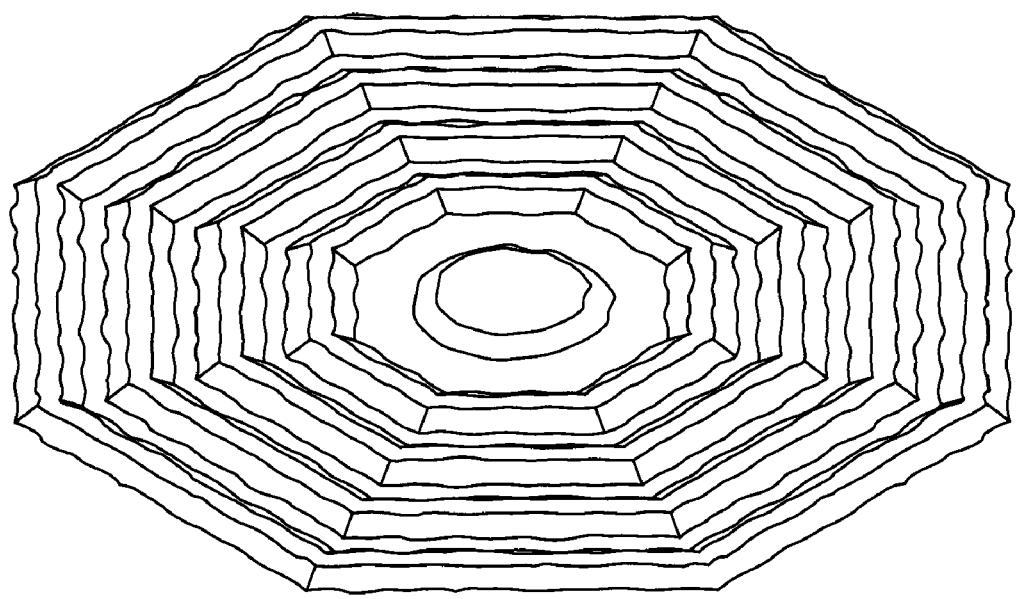
FIG. 7 is a close up of FIG. 6A.

FIG. 7 is a close up of FIG. 6A, showing the inconsistent quality of the micro formed structures and the surface roughness when no vacuum is applied to the isostatic molding process.

Figure 8:
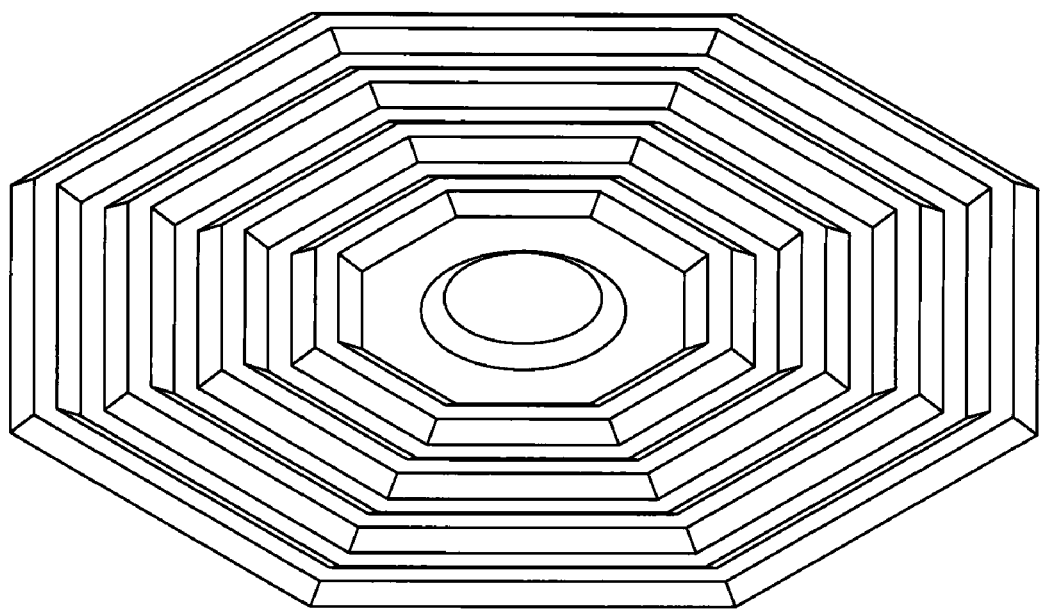
FIG. 8 is a close up of FIG. 6B.

FIG. 8 is a close up of FIG. 6B, showing the consistent quality of the micro formed structures and the improved surface roughness quality when a vacuum of 10 Torr was applied prior to the compression and fusing of the PTFE compound material.

Figure 9A:
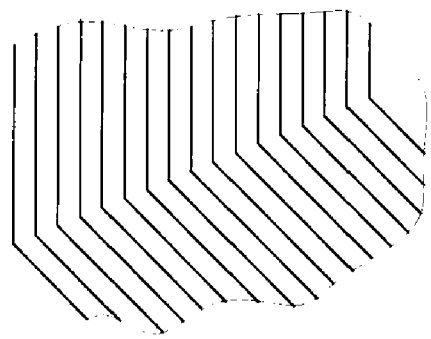
FIGS. 9A and 9B are optical micrographs of the results of the vacuum assisted PTFE molding process.
Figure 9B:
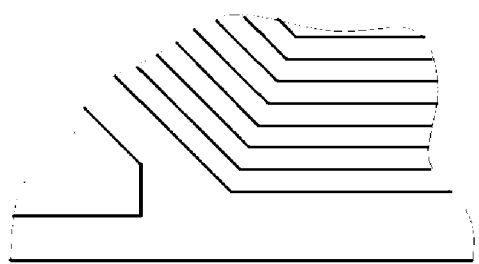

FIGS. 9A and 9E are optical micrographs illustrating the quality of the vacuum assisted PTFE molding process.

Figure 10A:
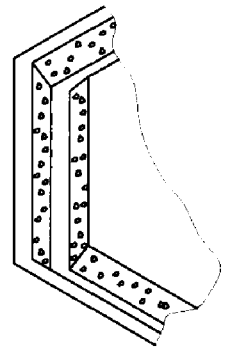
FIGS. 10A and 10B show the difference in surface roughness between FIG. 10A, no vacuum, and FIG. 10B, with a 10 Torr vacuum.
Figure 10B:
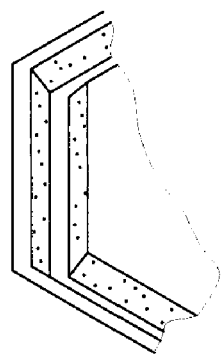

FIGS. 10A and 10B illustrate the difference in surface roughness between 10A—No Vacuum and 10B—10 Torr Vacuum.

Figure 11:
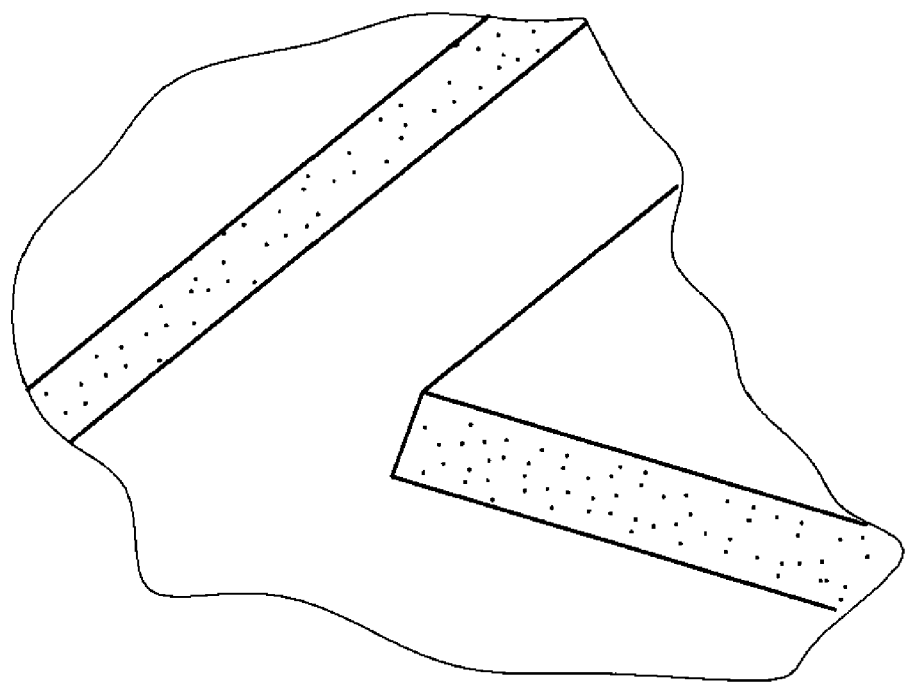
FIG. 11 is a close up of FIG. 10B.

FIG. 11 is a close up of FIG. 10B to show the improved surface roughness of the 10 Torr vacuum assisted molding process.

FIG. 12A is an illustration of an embodiment of a bolted compression design vacuum isostatic mold having 3 vacuum ports.

FIG. 12B illustrates a compressed and fused PTFE test slug in its final post vacuum isostatic molding state with the anvil/mandrel removed (unbolted).

FIG. 12C shows the electroformed shim resting on top of the compressed and fused PTFE test slug in its final post vacuum isostatic molding state with the anvil/mandrel removed (unbolted).

Next considering the process of the present invention in further detail and with reference to FIGS. 1-12C as discussed above, the vacuum assisted isostatic nano-molding technique utilizes a compression mold designed to compress raw powder or pelletized PTFE material. The mold itself has a series of small vacuum ports or a portion is made from porous or sintered stainless or aluminum which allows a vacuum to be drawn directly through the mold, to allow the mold to be placed under a vacuum so as to remove substantially all of the trapped air and/or moisture and thereby allow better compression and densification and reduce the chance for bubbles that could create discontinuities in the microstructure being formed. The mold also includes one or more heating elements which raise the temperature of the mold to drive off moisture contained within the material being molded and to begin to preheat the microstructures formed onto the mold that will ultimately form the features being molded. Depending on the feature sizes, a vacuum range between a low vacuum to a high vacuum is required. Using a rotary vacuum vane pump, a vacuum range between 1 Torr to $10^{-3}$ Torr is possible, overall range of useable vacuum is between ~760 Torr to $1\times10^{-9}$ Torr (low vacuum to high vacuum), higher vacuum is possible. For applications involving PTFE structure formation around 5 to 10 microns in size, the inventors have found that a vacuum of about 20 to 5 Torr is acceptable range and this range is considered a "medium vacuum."

At this point the mold anvil was bolted down to its designed hard stop position to apply compression force sufficient to reach the required density specification in conjunction with the vacuum and was placed into a furnace. The mold is then heated to a temperature of between 200° C. to 380° C. (depending upon on compound being molded) to achieve the fusion temperature of the material being molded. After reaching its critical fusion temperature, the part being molded is allowed to fuse for a dwell time of between 10 and 90 minutes, for example, depending on the compound, the size of mold, etc. It is to be appreciated that longer durations or dwell times may be required to achieve various physical characteristics or properties of the material being molded. After heating the mold to the desired temperature and remaining there for the desired dwell time, the mold is removed from the oven and quenched in water for a short duration of time, e.g, 20 to 45 minutes, for example, and then left to cool. After sufficient cooling of the mold, e.g., 45 minutes a few hours, for example, the mold was then opened to remove and retrieve the part being molded. Following removal of the part from the mold, the part is either at its final manufactured configuration or may be subjected to a machining or other finishing operation to produce one or more desired macro features in the part, such as location holes, perimeter cuts to fit packaging requirements, etc.

The vacuum assisted isostatic micro/nano-molding mold can be constructed in aluminum, tool steel, ceramic, composite construction or constructed out of stainless steel depending on the style of compression and the size of the part being molded. The base of the mold was dedicated to holding the micro structured shim or directly electro discharged machined with the features being formed.

The micro structures can be formed in a number of ways. One of the most cost effective is the formation of three dimensional structures by means of electro-forming nickel iron, nickel cobalt, gold or copper into negative features that are then used as the micro/nanostructure used to form the PTFE as it is compressed into these structures. An example of standard isostatic molding of micro structures is shown in FIG. 1.

The shim shown as an example in FIG. 1 was placed at the bottom to allow it to be covered by the PTFE material and the anvil was used to compress from above so that no direct contact was made to ensure that the shim survived the pre-compression of the mold. FIG. 2 shows a picture of the isostatic test mold used to perform the experiments. The vacuum pump was a standard bladder vacuum pump with a vacuum gauge capable of achieving <25 Torr vacuum. The vacuum was connected to the mold using pneumatic fittings which encircled the bottom of the mold. The vacuum is used to remove a majority of the air to allow further densification of the PTFE powder. The segments of the mold were fitted with polyimide film gaskets to provide an air tight seal.

Process & Results

A mold was loaded several times, using 1 $cm^3$ of PTFE raw material (10 micron particle size) and the vacuum was turned, with a vacuum of approximately 35 Torr, as the anvil was systematically screwed down in order to compress the material to a pressure of 225 psi. Three screws where used and a gapping shim was used to determine the maximum depth of compression required. Once compressed, the vacuum was turned off and the fittings were removed so that the mold could be loaded into the lab oven. After attaining a temperature of ~600° F. (~315° C.) over a 30 to 40 minute period, the material bonded together and the mold was removed from the oven and quenched in an ice bath which was at a temperature of approximately 33° F. (~0.5° C.) for a desired duration of time, e.g., a few seconds to many minutes or so. The mold was then removed from the ice bath and set aside and allowed to cool for approximately 1 hour before the mold was opened and the molded part, manufactured from PTFE, was removed. FIG. 1 is an example of a PTFE part following removal. This part tested PTFE material resolution using initial base parameters and was can be observed a further increase in pressure and smaller PTFE particle size is required to resolve the sub-micron blazed structure of the shim (~0.2 to 0.3 micron blaze). This test part was significant in showing the possibilities of the PTFE micro-molding technique and its ability to resolve features that are useful for shorter wavelength applications.

A test was conducted on a diffusion based retro-reflecting structure. FIG. 2 shows the square pillar array formed into PTFE. As shown, the structure is very uniform, with ~17 micron wide channels and with pillars ~75 microns square, and shows how precise and accurate micro structures can be produced using the vacuum assisted and non-assisted process. These structures have a potential for other applications such as medical diagnostic devices and Inkjet fluidic channels, nozzles or filters. Due to its inert nature PTFE can maintain its structure even with high thermal temperatures or corrosive fluids. This structure utilized a 3 micron particle size PTFE powder with a high molecular weight.

A random diffusing (Random pattern/uniform density) structure was produce using a metal embossing mandrel shown in FIG. 3, with the resulting structure shown as well. The PTFE raw material had a particle size of 6 microns and the resulting structure was a near perfect replica of the metal mandrel. Since the topography was shallow it was easier for the material to conform to the texture of the mandrel.

Retroreflective Functional Test

A functional test was performed on a two dimension offset 24 beam splitter replica to compare its performance to the original mandrel using a monochromatic 630 nm laser light source. As can be observed in FIGS. 4A, B, and C, D—the original sub-micron micro-structure replicates fairly well and the replica surface is capable of splitting the light within the same general characteristics of the original mandrel. The curvature of the split beams is due to the projection screen where it was viewed and recorded.

In summary, therefore, the process of the present invention for the manufacture of micro or nanostructure surfaces or parts formed of PTFE includes the steps of:

(1) applying a vacuum to the powder or granulated PTFE located in the compression isostatic mold having an optimized vacuum of between 75 Torr and 1 Torr, (2) applying compression anvil within the metallic mold which the mold has an inside surface which conforms closely to the adjacent outer surface of the anvil, (3) heating of said mold between, achieve fusion of said PTFE placed under vacuum to said micro/nanostructured mold by reason of the differential cubic expansion of PTFE to said mold resulting in the formation of pressure on said PTFE material and micro/nanostructured mold insert or micro/nanostructured surface within said mold, and (4) removing said mold from said bath and quenching said mold with water to cause more rapid cooling of said mold than the micro structured mold or mold insert (nickel electroformed or silicon) therein, thereby maintaining said pressure thereon during at least a portion of the quench.

The above described process may further include the steps of:

(A) applying a vacuum of between 760 Torr and $1 \times 10^{-9}$ Torr, and (B) heating the mold, by one of an oven or integrated heating elements installed on the mold, to a temperature of between 100° C. and 450° C. and applying a pressure to the mold of between 10 psi and 10,000 psi.

The process may also employ a combination of PTFE and FEP, with a fusion temperature between 200° C. and 390° C., as the compound and applying a vacuum between 760 Torr and $1 \times 10^{-9}$ Torr.

Next considering the mold and mold insert, the mold or mold insert may be manufactured from sintered metal to allow the vacuum to be applied across a surface holding the micro or nanostructures or in close proximity, or from sintered ceramic to likewise allow the vacuum to be applied across the surface holding the micro or nanostructures or in close proximity, or from sintered stainless steel.

In still further embodiments of the present invention, a heating element may be integrated into the mold or mold insert to allow preheating of the micro or nanostructured surface, following the application of the vacuum.

The process of the present invention may also be employed in the reconfiguring a quantity of prior solidified material by either isostatic molding or non fused compression molding of a high density high molecular weight polymer material such as PTFE or FEP.

This embodiment of the process of the present invention includes the steps of:

(1) supporting the quantity in a space between rigid metal mold members at least one of which has formed thereon a micro/nanostructured surface different than that of said quantity, with the difference in volume between said mold members and said quantity closely approximating the difference in cubic expansion of said quantity and said members at an elevated temperature approaching or exceeding the melt temperature of said polymer, heating said quantity and said mold members together to cause said quantity to expand to said differential configuration, fusing or bonding together, and (2) cooling said quantity and said members together to maintain pressure between said quantity and members during at least an initial portion of said cooling.

(3). The quantity of prior solidified material may be comprised of: (A) a compressed powder block of high molecular weight polymer material such as PTFE or FEP, with a particle size between 0.25 μm and 120 μm (microns), (B) a compressed granulated block of high molecular weight polymer material such as PTFE or FEP, with a granule size between 0.1 μm and 800 μm (microns), (C) a block of high molecular weight polymer material such as PTFE or FEP, which is pressed against an electro-formed mold insert with micro or nano structures ranging in width or pitch or depth between 0.040 μm to 500 μm (microns), (D) a block of high molecular weight polymer material such as PTFE or FEP, which is pressed against an etched silicon mold insert with micro or nano structures between 0.040 μm and 1000 μm (microns) tall with widths between 0.040 μm and 1000 μm (microns), or (E) a block of high molecular weight polymer material such as PTFE or FEP, which is pressed against an etched silicon mold insert or electroformed mold or mold insert with micro or nano structures between 0.040 μm and 1000 μm (microns) tall with widths between 0.040 μm and 1000 μm (microns).

In still further embodiments of the process of the present invention, the micro mold and mold insert may be comprised of structures formed with a draft wall angle between 0.1° and 20° half angle, with a corner radius of at least 10% of the smallest dimensional depth and width of the channel, with an aspect ratio of 20:1 (depth/height:width) or smaller, and the curing, bonding or fusing temperature may be between 100° C. and 450° C.

The process may also include the step of quenching said mold with water to cause more rapid cooling of said mold than cooling of the micro structured mold or mold insert (nickel electroformed or silicon) components therein, thereby maintaining said pressure thereon during at least a portion of the quench.

In other embodiments of the mold, a heating element may be integrated into the mold or mold insert to allow preheating of the micro or nanostructured surface, following the application of the vacuum; a metal structure, such as electrical conductor, optical coating or structural component, may be embedded in the mold or mold insert.

The mold or mold insert may have a release layer on which the micro or nanostructures are formed for transfer from the mold or mold insert into the cured, fused or compressed PTFE or FEP compound or compounds of either, which will be molded with the molded PTFE or FEP or compounds of either once released from the mold transfer. In a metallization process, the depositing of a coating (organic or inorganic) and formation of a pre-etched and mounted metal structures take place by means of liftoff, where the release layer allows the deposited material residing on top of the release layer, attached or bonded to be released during the molding process and to transfer to the final formed PTFE or FEP or other compounds of either material.

The micro or nanostructure surfaces or parts formed of PTFE according to the process of the present invention may include, for example, a microfluidic channeled device for applications involving caustic chemistry and bio analysis chemistry. Such devices as formed by the processes of the present invention may be comprised of a PTFE or FEP or high molecular weight polymer material, formed into a micro and/or nanostructured surface with varying depths and widths of channels, sample pools, nozzles, transfer holes to transfer fluid materials for the front to back surfaces and filtration features, such as sections of pillars of various geometry to act as filters defined by the separation distance between the pillars.

The micro and/or nanostructured surfaces may include complex surface geometries and features, such as diffractive or diffusion structures for shaping and directing light emitted from coherent and incoherent radiation sources and may include, for example, continuous surface profiles, such as aspheric surfaces, prismatic, retro-reflective, corner cube or faceted reflective surfaces matched to a specific wavelength or wavelengths of radiation to collect, reflect and shape radiation emitted from coherent and incoherent radiation sources, such as high brightness light emitting diodes or high intensity lamps and laser sources. Such reflective diffractive, refractive, geometric or aspheric structures may have dimensions between, 0.1 μm to 3000 mm and arrays of reflective or aspheric structures may have dimensions between, 0.1 μm to 3000 mm, with a pitch of 100 μm to 300 mm in either linear or rectangular or circular arrays.

Since certain changes may be made in the above described vacuum assisted isostatic and standard isostatic pressure micro-molding process, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A process of forming at least one of a micro and a nanostructure surface in a part formed of PTFE, the process comprising the steps of:
    inserting one of powdered PTFE and granulated PTFE within a mold cavity of a compression isostatic mold;
    forming at least one of a micro and a nanostructure surface, comprising at least one shim, on one of a surface of a compression anvil, for applying a compression pressure, and a surface of the mold;
    providing the at least one of the micro and the nanostructure surface, comprising the at least one shim, with one of a pitch and a depth ranging 0.040 μm and 1000 μm and surface geometries dimensions between 0.1 μm to 3000 mm to form one of diffractive and diffusion structures for shaping and directing light emitted from coherent and incoherent radiation sources;
    determining a depth of compression of the compression anvil using the at least one shim of the at least one of the micro and the nanostructure surface;
    forcing the compression anvil into the mold cavity of the compression isostatic mold with a compression pressure of between 10 psi and 10,000 psi and cause the one of the powdered PTFE and the granulated PTFE to engage with the at least one shim of the at least one of the micro and the nanostructure surface, and designing a perimeter surface of the compression anvil so as to closely conform to a perimeter of the mold cavity;
    providing a seal between the perimeter surface of the compression anvil and the perimeter of the mold cavity of the compression isostatic mold;
    applying a vacuum of between 760 Torr and $1 \times 10^{-9}$ Torr to the PTFE contained within the compression isostatic mold;
    integrating a heating element into at least one of the compression anvil and the at least one shim of the at least one of the micro and the nanostructure surface;
    preheating the at least one of the compression anvil and the at least one shim of the at least one of the micro and the nanostructure surface, via the heating element, for at least one of reducing and removing moisture contained within the PTFE, and initiating a temperature rise of the at least one of the compression anvil and the at least one shim of the at least one of the micro and the nanostructure surface, wherein said temperature rise of the at least one of the compression anvil and the at least one shim of the at least one of the micro and the nanostructure surface begins heating the PTFE during compression;
    heating of the compression isostatic mold to a temperature of between 100° C. and 450° C., via one of an oven and the integrated heating element, so as to fuse the PTFE, while under vacuum, to the at least one shim of the at least one of the micro and the nanostructure surface,
    such that the PTFE conforms to a shape of the at least one shim of the at least one of the micro and the nanostructure surface;
    quenching the compression isostatic mold while still maintaining the pressure on the compression isostatic mold for at least a portion of the quenching; and thereafter
    removing the part, formed from PTFE with at least one shim of the at least one of the micro and the nanostructure surface, from the compression isostatic mold.

2. The process according to claim 1, further comprising the step of combining FEP with one of the powdered PTFE and the granulated PTFE and utilizing a fusion temperature between 200° C. and 390° C.

3. The method according to claim 1, further comprising the step of manufacturing at least one of the compression isostatic mold and the compression anvil from sintered metal to allow the vacuum to be applied at least one of across a surface holding the micro and the nanostructure surface and in close proximity thereto.

4. The method according to claim 1, further comprising the step of manufacturing at least one of the compression isostatic mold and the compression anvil from sintered ceramic to allow the vacuum to be applied at least one of across the surface holding the micro and the nanostructure surface and in close proximity.

5. The method according to claim 1, further comprising the step of manufacturing at least one of the compression isostatic mold and the compression anvil from sintered stainless steel.

6. The process according to claim 2, further comprising the step of allowing the PTFE to fuse for a duration of between 10 minutes and 90 minutes.

7. The process according to claim 1, further comprising the step of forming at least one of a micro and a nanostructure surface, comprising at least one shim, on one of a base surface of the mold cavity of the compression isostatic mold, for applying a compression pressure, and a surface of the mold.

8. The process according to claim 1, further comprising the step of integrating a release layer on one of the micro and the nanostructure surface, wherein said release layer is to be released from the one of the micro and the nanostructure surface and one of bonded and attached to the final formed part, formed from PTFE, during the molding process.

9. The process according to claim 1, wherein quenching of the compression isostatic mold is for a duration of between 20 and 45 minutes.

10. The process according to claim 1, further comprising the step of cooling the compression isostatic mold for a duration of between 45 minutes and 3 hours, prior to removing the part, formed from PTFE, from the compression isostatic mold.

11. A process of forming at least one of a micro and a nanostructure surface in a part formed of PTFE, the process comprising the steps of:
    inserting one of powdered PTFE and granulated PTFE within a mold cavity of a compression isostatic mold, wherein the compression isostatic mold is manufactured from one of a sintered metal and a sintered ceramic;
    combining FEP with on of the powdered PTFE and the granulated PTFE;
    forming at least one of a micro and a nanostructure surface, comprising at least one shim, on one of a surface of a compression anvil, for applying a compression pressure, and a surface of the mold, wherein the compression anvil is manufactured from one of a sintered metal and a sintered ceramic;
    providing the at least one of the micro and the nanostructure surface, comprising the at least one shim, with one of a pitch and a depth ranging 0.040 μm and 1000 μm and surface geometries dimensions between 0.1 μm to 3000 mm to form one of diffractive and diffusion structures for shaping and directing light emitted from coherent and incoherent radiation sources;

integrating a release layer on one of the micro and the nanostructure surface;

determining a depth of compression of the compression anvil using the at least one shim of the at least one of the micro and the nanostructure surface;

forcing the compression anvil into the mold cavity of the compression isostatic mold with a compression pressure of between 10 psi and 10,000 psi and cause the one of the powdered PTFE and the granulated PTFE to engage with the at least one shim of the at least one of the micro and the nanostructure surface, and designing a perimeter surface of the compression anvil so as to closely conform to a perimeter of the mold cavity;

providing a seal between the perimeter surface of the compression anvil and the perimeter of the mold cavity of the compression isostatic mold;

applying a vacuum of between 760 Torr and $1 \times 10^{-9}$ Torr to the PTFE contained within the compression isostatic mold;

integrating a heating element into at least one of the compression anvil and the at least one shim of the at least one of the micro and the nanostructure surface;

preheating the at least one of the compression anvil and the at least one shim of the at least one of the micro and the nanostructure surface, via the heating element, for at least one of reducing and removing moisture contained within the PTFE, and initiating a temperature rise of the at least one of the compression anvil and the at least one shim of the at least one of the micro and the nanostructure surface, wherein said temperature rise of the at least one of the compression anvil and the at least one shim of the at least one of the micro and the nanostructure surface begins heating the PTFE during compression;

heating of the compression isostatic mold to a temperature of between 100° C. and 450° C., via one of an oven and the integrated heating element, so as to fuse the PTFE, while under vacuum, to the at least one shim of the at least one of the micro and the nanostructure surface, such that the PTFE conforms to a shape of the at least one shim of the at least one of the micro and the nanostructure surface;

releasing the release layer from the one of the micro and the nanostructure surface and one of bonding and attaching the release layer to the PTFE;

allowing the PTFE to fuse for a duration of between 10 minutes and 90 minutes;

quenching the compression isostatic mold for a duration of between 20 minutes and 45 minutes while still maintaining the pressure on the compression isostatic mold for at least a portion of the quenching;

cooling the compression isostatic mold for a duration of between 45 minutes and 3 hours;

removing the part, formed from PTFE with at least one shim of the at least one of the micro and the nanostructure surface, from the compression isostatic mold.

* * * * *